United States Patent [19]

Baumbach

[11] 4,422,121

[45] Dec. 20, 1983

[54] LINE PROTECTOR FOR A COMMUNICATIONS CIRCUIT

[75] Inventor: Bertram W. Baumbach, Arlington Heights, Ill.

[73] Assignee: Reliance Electric Company, Cleveland, Ohio

[21] Appl. No.: 383,278

[22] Filed: May 28, 1982

[51] Int. Cl.³ .............................................. H02H 9/06

[52] U.S. Cl. .................................... 361/119; 361/124; 337/29; 337/32; 337/34

[58] Field of Search ............... 361/119, 124, 120, 118; 179/96-99, 174, 78 A; 337/28, 29, 32-34

[56] References Cited

U.S. PATENT DOCUMENTS

| | | | |
|---|---|---|---|
| 4,074,337 | 2/1978 | Debortoli et al. | 361/124 |
| 4,307,430 | 12/1981 | Montalto et al. | 361/124 |
| 4,325,100 | 4/1982 | Baumbach | 361/124 X |
| 4,335,416 | 6/1982 | Hollfelder et al. | 361/124 X |

*Primary Examiner*—Patrick R. Salce
*Attorney, Agent, or Firm*—Trexler, Bushnell & Wolters, Ltd.

[57] ABSTRACT

A line protector for central office use comprises an elongated housing open at one side for receiving components and a cover for the opening. First and second surge arresters are coaxially positioned within the housing. First and second line terminals are respectively connected to the arresters as is a common ground terminal. The three terminals project from one end of the housing in the provision of coplanar flat pins for plug-in connection with a circuit board edge connector. Means including a test contact in the housing permits use of a test probe to test the lines while the protector is plugged into the connector. A shiftable insulator in the housing is used optionally to interrupt the inside lines at the line terminal pins.

6 Claims, 8 Drawing Figures

LINE PROTECTOR FOR A COMMUNICATIONS CIRCUIT

BACKGROUND OF THE INVENTION

This invention relates to line protectors for communications circuits, and more particularly to a protector commonly known in the art as a central office protector. Protectors of this kind are used to protect inside plant or central office equipment from surge voltages and overcurrent faults that may appear on incoming lines as a result of power line faults, lightning or the like.

Many central office protectors are designed to provide protection against overcurrent faults that may result from low voltage or "sneak" currents. These sneak currents can damage the protector or the equipment to be protected. As a result, many central office protectors embody heat coils which become heated in an overcurrent condition on the line. The heat generated by the heat coil is applied to solder that melts and releases a mechanism to cause the line to become grounded. However, there are numerous telephone installations in which the cables are underground where they are isolated from power lines or other potential sources of faults that cause sneak currents, and as a result line protectors for such telephone systems often do not require heat coils.

Line protectors of the foregoing type are generally constructed in the form of modules which are plugged into termination members or connectors which are, in turn, mounted on a telephone main distribution frame. In many urban areas with rapidly expanding telephone systems there is a problem of finding suitable floor space for all of the termination structure for the central office. With space at a premium it is important that the protector module be as compact as is reasonably possible and still be dependable in operation.

OBJECTS AND SUMMARY OF THE INVENTION

An object of this invention is to provide a protector module which has a relatively small transverse cross-sectional area, thereby reducing the amount of space required to mount a large number of such modules on companion termination structure on the main distribution frame.

A further object of this invention is to provide a line protector of the type stated which can be plugged into a known type of connector, more particularly a connector of the type known as a printed circuit board edge connector.

A still further object of this invention is to provide a line protector of the type stated which is designed to accept carbon type surge voltage arresters as well as two and three element gas tube types of surge voltage arresters.

Yet another object of this invention is to provide a line protector of the type stated which is designed to accept test probes for line testing without the necessity of having to remove the module from its connector, thereby eliminating the need for a separate test field.

In accordance with the foreging objects the line protector comprises a dielectric elongated housing open at one side for receiving the components of the protector, said housing having means interior thereof for supporting first and second surge voltage arresters in substantially coaxial relationship with the longitudinal axis of the housing, a first line terminal electrically connected to one arrester, a second line terminal electrically connected to the other arrester, the first line terminal extending from one end of the housing the full length of both arresters into the other end of the housing, the second line terminal being substantially at said other end of the housing, a ground terminal connected to both arresters intermediate the ends of the housing and extending along only one of the two arresters to said other end of the housing, pins on each of said terminals projecting from said other housing end, a cover over said opening, and a test contact in electrically conductive connection with said second line terminal and extending therefrom to a region at said one housing end, said housing having means at said one end for access to said first line terminal and said test contact by a test probe.

The line protector is further characterized in that said pins are generally flat and lie substantially in the same plane for reception by the edge connector, and there is an insulator in said housing that is shiftable therein from a retracted position substantially clear of one side of said pin to an extended or "detent" position in which the insulator overlies said one side of each of said line terminal pins while leaving exposed at said one side the pin on said ground terminal. In the aforesaid extended position the incoming line is grounded while the line to the equipment inside is interrupted.

DETAILED DESCRIPTION

Figure 1:
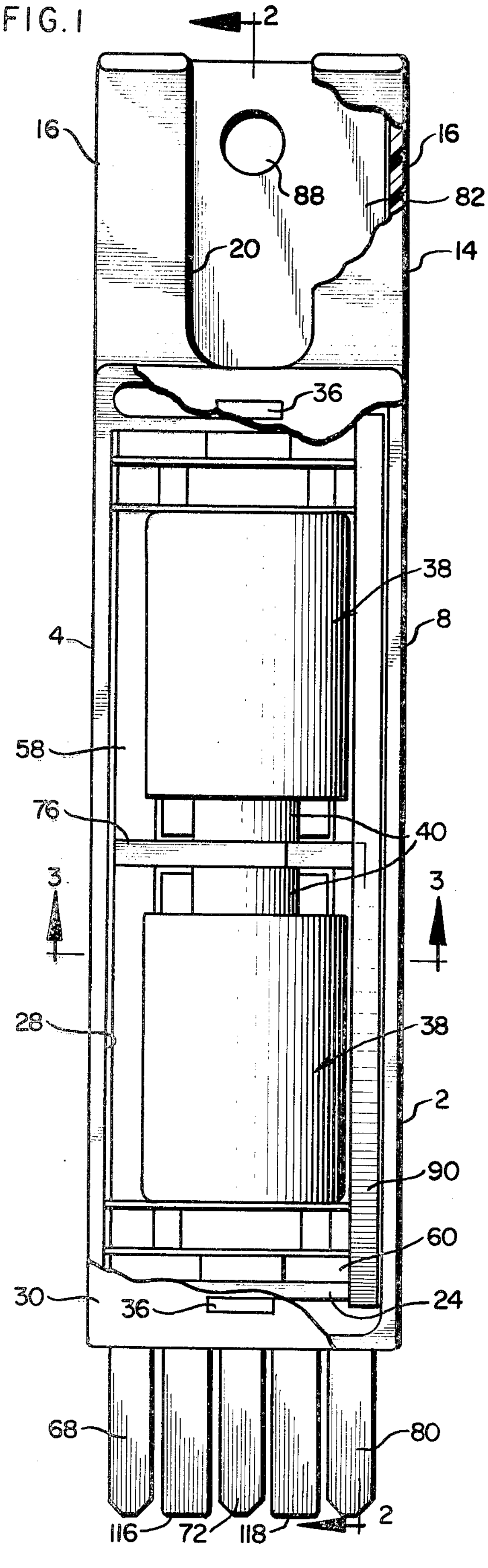
FIG. 1 is a top plan view partially broken and in section of a protector constructed in accordance and embodying the present invention.

Referring now in more detail to the drawing, 1 designates a line protector module comprising a dielectric plastic housing 2 which is of generally rectilinear form. The housing has sidewalls 4, 6, 8 and outer end walls 10, 12. The outer end wall 10 and the sidewall 6 cooperate to define a handle 14 by which the protector module 1 may be grasped. The shape of the handle is such as to define parallel sections 16, 16 which define aligned slots 18, 18 and a clearance or access space 20. Spaced inwardly of the outer end walls 10, 12 the housing integrally includes inner end walls 22, 24. Each inner end wall has a tapered locking lip 26, 26 for purposes presently more fully appearing.

Figure 5:
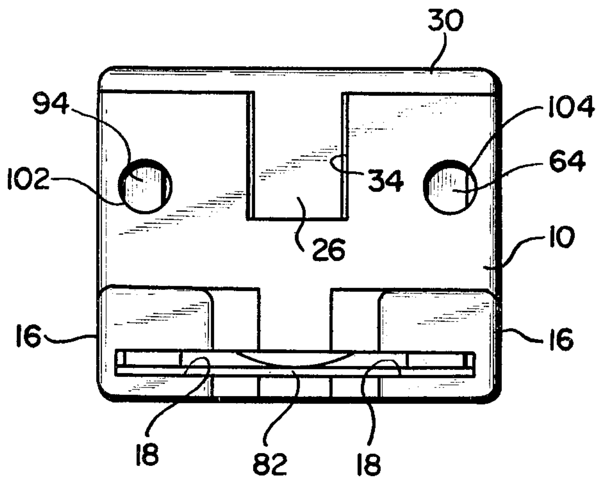
FIG. 5 is an end elevational view of the protector as seen from the end of the module at which the handle is located.

The sidewalls 4, 8 and the outer end walls 10, 12 define a side opening 28 into the housing and through which the components of the protector are inserted into the housing 2 during assembly of the protector 1. A generally rectangular dielectric plastic cover 30 is adapted to be removably positioned over the opening 28. Formed on the cover 30 are depending tapered locking lips 32, 32 which snap fit into locking engagement respectively with the locking lip 26, 26. The outer end walls 10, 12 are slotted as at 34 (FIGS. 2 and 5) for receiving the locking lips 32 so that the locking lips 32 are flush with the respective outer end walls 10, 12. A narrow screwdriver slot 36 is provided at each end of the cover 30 whereby the locking lips 26, 32 may be pried apart to facilitate removal of the cover 30.

Positioned within the housing 2 are first and second coaxial surge voltage arresters 38, 38 of similar construction. Each surge voltage arrester comprises a carbon rod electrode 40 that is bonded to a surrounding tubular insulator 42. A carbon disc electrode 44 (FIG. 2) is positioned flush against the end of the insulator 42, and the adjacent end of the rod electrode 40 is recessed within the insulator 42 to provide an arc gap 46. Each arrester 38 further includes a cylindrical metal cup 48 in which the electrodes are housed such that rod electrode 40 projects outwardly axially of the open end of the cup 48. An annular solder ring 50 is disposed between each disc electrode 44 and the end wall 52 of the associated cup 48. To accommodate and position the aligned arresters 38, 38 the sidewall 6 at the central portion thereof is formed with a cradle 54 having a cylindrical surface portion 56 which receives in flush-fitting relationship portions of the cups 48.

Figure 3:
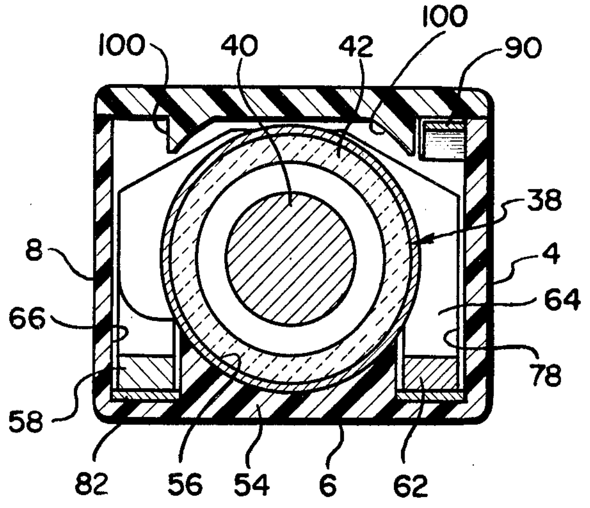
FIG. 3 is a sectional view taken along line 3—3 of FIG. 1.

Mounted within the housing 2 are first and second metallic line terminals 58, 60 and a ground terminal 62. The first or longer line terminal 58 has a transverse contact portion 64 in the form of a plate that is at right angles to the adjacent part of the terminal 58. This long terminal 58 extends along the housing for substantially the full length thereof and also lies in a groove 66 (FIG. 3) that is defined by the sidewalls 6, 8 and the cradle 54. Remote from the contact 64 the line terminal 58 ends in a substantially flat pin 68 that projects outwardly of the housing at the end wall 12 thereof. Between the contact 64 and the adjacent arrester cup end wall 52 is a generally U-shaped spring 70.

The second or short terminal 60 is provided with a contact portion 73 which is at right angles to the adjacent part of the terminal 60. The terminal 60 also projects outwardly of the housing at the end wall 12 in the provision of a flat pin 72. Positioned between the contact portion 73 and the end wall of the adjacent arrester cup is a generally U-shaped spring 74 which is similar to the spring 70.

The ground terminal 62 has its transversely extending contact portion 76 intermediate and parallel to the contact portions 64, 73. Furthermore, the contact portion 76 is engaged on opposite sides thereof by the respective ends of the rod electrodes 40 of the arresters 38. The ground terminal 62 is seated in a groove 78 (FIG. 3) as defined by the sidewalls 4, 6 and the cradle 54. The cradle 54 and the arrangement forming the grooves 66, 78 for the terminals 58, 62 aid in preventing short circuiting between the terminals and the arrester units 38. As with the line terminals the ground terminal 62 includes a substantially flat pin 80 that projects outwardly from the end wall 12 and is substantially coplanar with and coextensive with the line terminal pins 68, 72, previously described.

Figure 4:
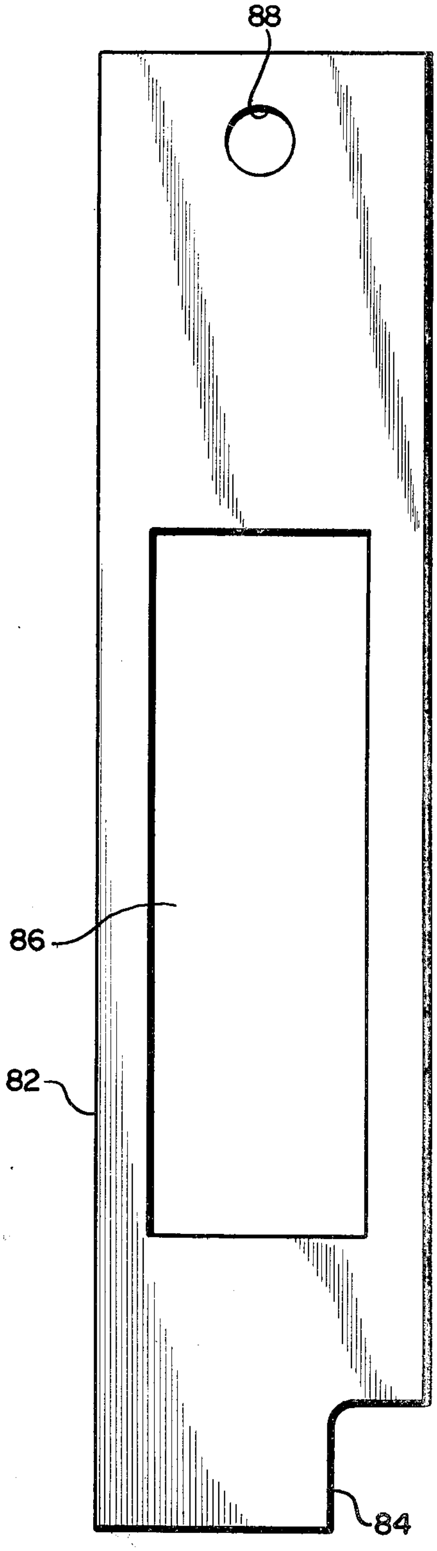
FIG. 4 is a top plan view of the insulator plate which forms part of the present invention.

Also forming part of the arrester module 1 is a flat sheet of insulating material 82 best shown in FIG. 4. This insulator 82 is a substantially rectangular sheet of suitable plastic having a notch 84 at one corner thereof and a large substantially central rectangular opening or cut-out 86. The insulator 82 is positioned within the housing 2 against the inside surface of the wall 6. The cut-out 86 provides for clearance with the components within the housing and allows the insulator 82 to be longitudinally shifted between the position shown in FIG. 2 and that shown in FIG. 6. Clearance is provided between the insulator 82 and the inner and outer end walls to permit the shifting of the insulator. Also, the width of the cut-out 86 is slightly greater than the width of the cradle 54 whereby the insulator 82 lies within the grooves 66, 78. Furthermore, the insulator 82 extends into the handle 14 and is disposed in the slot 18, 18, spanning the clearance space 20. A hole 88 may be formed at the part of the insulator 82 that is in the clearance space 20 so that the insulator may be manipulated by a suitable tool. Also within the housing 2 is a test contact 90 having a resilient, bowed configuration and which spans the space between the end walls 22, 24. At its opposite ends the test contact 90 is bent to form tabs 92, 94 which overlie the outside surfaces of the respective inner walls 22, 24. Adjacent to the tabs 92, 94 the test contact 90 seats in the notches 96, 98 in the respective end walls 22, 24. The test contact 90 engages the short line terminal 60 at its contact 73, and the inside of the cover 30 is formed with one or more ribs 100 which cooperates with the adjacent sidewall 4 to retain the test contact 90 in proper position and in engagement with the line terminal 60. The two ribs 100, 100 render the cover symmetrical and allow the cover to be installed onto the housing 2 in either of two positions of orientation.

Figure 7:
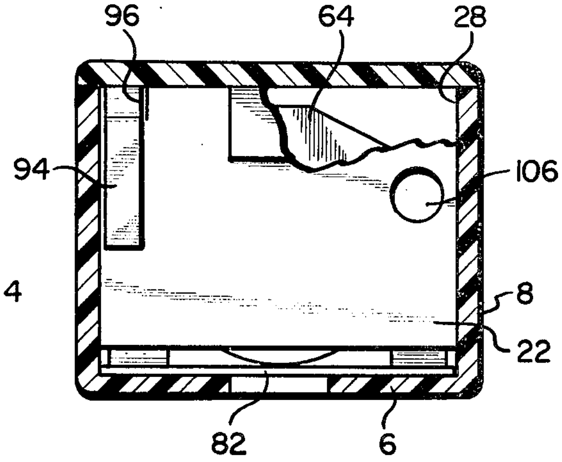
FIG. 7 is a sectional view, also partially broken away, and taken along line 7—7 of FIG. 6.
Figure 8:
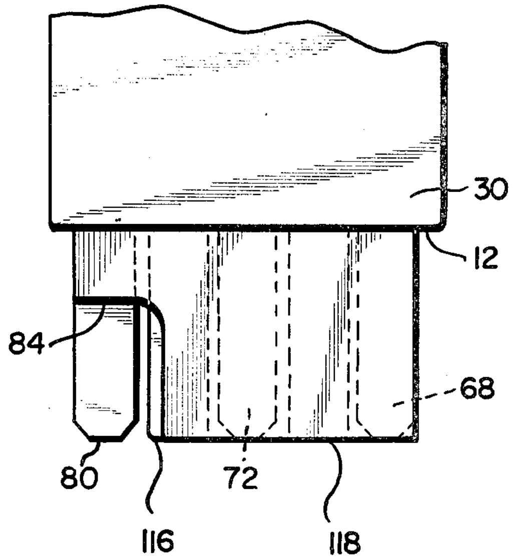
FIG. 8 is a fragmentary elevational view as seen from line 8—8 of FIG. 6.

The outer end wall 10 is formed with a hole 102 which provides access to the test contact tab 94 by a suitable line test probe. Likewise, the end wall 10 has a second hole 104 which provides access to the space between the walls 10, 22, and in addition there is a hole 106 (FIG. 7) in the wall 22. The holes 104, 106 are in alignment thereby providing direct access by a test probe to the long terminal contact 64. Consequently, the perforate housing provides convenient access to each of the line terminals 58, 60 and so it is possible to test the tip and ring circuits of the communications line without the necessity of having to remove the module from its connector. Moreover, the requirement for a separate test field is eliminated.

Figure 2:
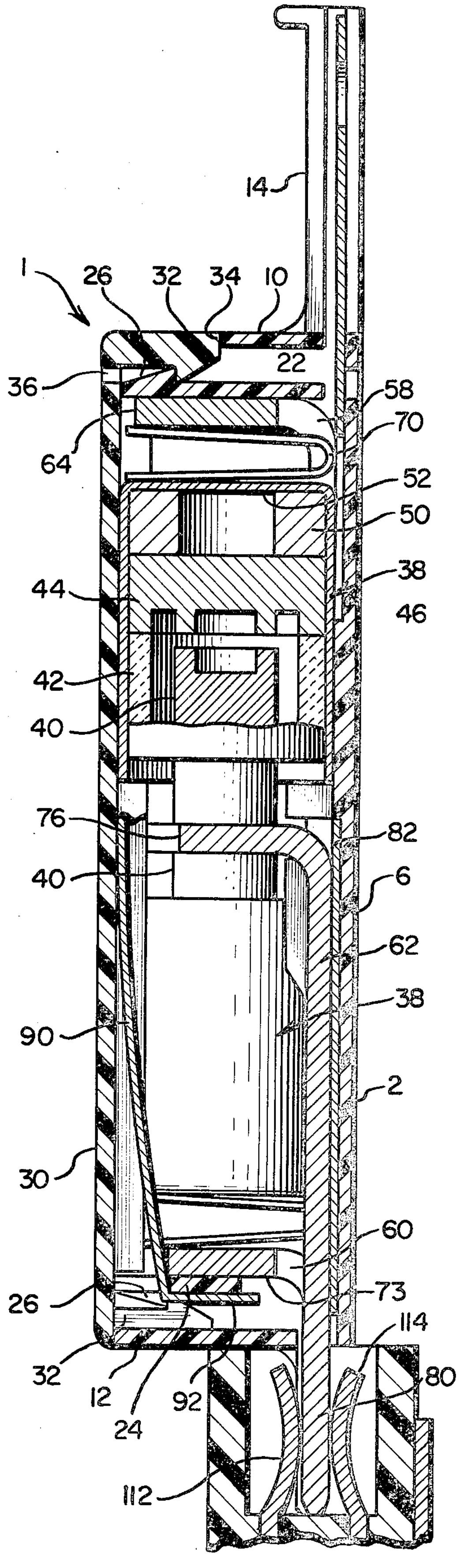
FIG. 2 is a sectional view taken along line 2—2 and showing the protector plugged into an edge connector.
Figure 6:
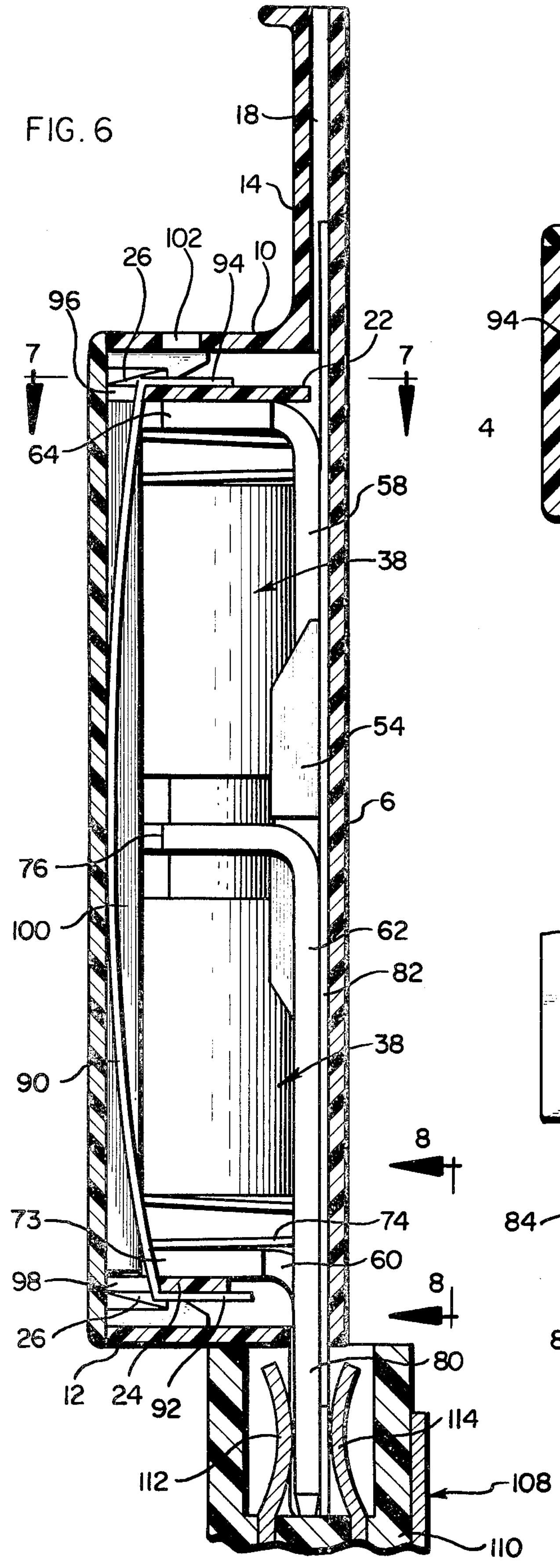
FIG. 6 is a fragmentary longitudinal sectional view of the module and showing the insulator plate in the extended position to place the module in the "detent" position.

The module is desinged to be plugged into a conventional edge connector 108 shown fragmentarily in FIGS. 2 and 6. Conventionally, the edge connector includes a dielectric housing 110 and pairs of arcuate, resilient terminals 112, 114 which spread apart as a flat terminal is inserted therebetween. Only one pair of terminals 112, 114, is shown, but it will be understood that there are a number of such terminals in pairs and in alignment which are identical to those shown. The terminals 112, 114 are illustrated as being in engagement with the ground pin 80, but it will be understood that a like pair of terminals 112, 114 will be in engagement with each of the line pins 68, 72. Thus, each module will utilize three adjacent pairs of edge connector terminals. The modules can be installed side-by-side on the edge connector, and a multiplicity of edge connectors may be mounted on a single main distribution frame.

When the insulator 82 is in the retracted position shown in FIG. 2 the line contact pins 68, 72 will be in conductive contact with their respective edge connector terminals 112, 114. Similarly the ground pin 80 will be in conductive connection with its edge connector terminals 112, 114. When the insulator 82 is longitudinally shifted to its extended position, as shown in FIG. 6, the insulator 82 will cover one side of each of the line pins 68, 72 and will become lodged between those line pins and their associated terminals 114, thereby breaking the electrical connection between the terminal 114 and the associated line pin. At the same time, the presence of the notch 84 leaves the ground pin 80 in electrical contact with its associated contacts 112, 114. Consequently, under such conditions the terminal is placed in its so-called detent position in which the incoming line is grounded on both the tip and ring sides while at the same time the connections between the lines and the inside plant equipment is interrupted.

In functioning as a surge protector a voltage surge of short duration appearing on either line terminal 58 or 60 will cause a spark across arc gap 46 of the associated arrester 38. The voltage surge will be grounded through the arrester's rod electrode 40 and the ground terminal 62. A sustained arcing will generate sufficient heat to melt the associated solder element 50 whereupon the associated spring 70 or 74 will press the edge of the cup 48 into direct contact with the contact 76 of the ground terminal 62, thereby grounding the line.

While carbon air gap arresters have been shown and described it will be apparent that two element gas tube surge arresters of the same size as the carbon arresters may be used. Moreover, the two end-to-end surge voltage arresters may be formed by a three-electrode gas tube having one electrode electrically connected to the contact portion of the first line terminal 58 another electrode electrically connected to the contact portion of the second line terminal 60, and a third electrode electrically connected to the contact portion of the ground terminal 62, the ground terminal contact being appropriately modified in a known manner.

The end of the housing at which the line and ground pins are located is integrally molded with a pair of fingers 116, 118 which are flat and are coplanar with the side-by-side line and ground pins. One finger is between the pin 68, 72 and another is between the pin 72 and the pin 80. These fingers 116, 118 assist in lining up the pins with their respective pairs of edge connector terminals 112, 114 because the fingers 116, 118 will position themselves between pairs of terminals 112, 114. Moreover, the fingers 116, 118 will prevent the line and ground pins from being inserted "behind" the edge connector terminals rather than between them.

What is claimed is:

1. A line protector for a communications circuit comprising a dielectric elongated housing open at one side for receiving the components of the protector, said housing having means interior thereof for supporting first and second surge voltage arresters in substantially coaxial relationship with the longitudinal axis of the housing, a first line terminal electrically connected to one arrester, a second line terminal electrically connected to the other arrester, the first line terminal extending from one end of the housing the full length of both arresters and to the other end of the housing, the second line terminal being substantially at said other end of the housing, a ground terminal connected to both arresters intermediate the ends of the housing and extending along only one of the two arresters to said other end of the housing, pins on each of said terminals projecting from said other housing end, a cover over said opening, and a test contact in electrically conductive connection with said second line terminal and extending therefrom to a region at said one housing end, said housing having means at said one end for access to said first line terminal and said test contact by a test probe.

2. A line protector according to claim 1 in which said pins are generally flat and lie substantially in the same plane, and there is an insulator in said housing that is shiftable therein from a retracted position substantially clear of one side of each of said pins to an extended position in which the insulator overlies said one side of each of said line terminal pins while leaving exposed at said one side the pin on said ground terminal.

3. A line protector according to claim 1 or claim 2 wherein said test contact is retained in said housing by said cover.

4. A line protector for a communications circuit comprising a dielectric housing having an elongated cavity with opposite ends, a first line terminal having a contact portion substantially at one end of the cavity, said first line terminal extending longitudinally of said cavity from said contact portion to the other end of the cavity and having a pin portion projecting outwardly of the housing adjacent to said other end, a second line terminal having a contact portion substantially at said other end of the cavity, said second line terminal having a pin portion projecting outwardly of the housing adjacent to said other end, a ground terminal having a single contact portion located intermediate the contact portions of said line terminals, said ground terminal extending from its contact portion longitudinally of said cavity to said other end and having a pin portion projecting outwardly of the housing adjacent to said other end whereby to provide three side-by-side pin portions of the respective terminals, a first surge voltage arrester in said housing and having opposed electrodes, one electrode being electrically connected to the contact portion of one line terminal, a second surge voltage arrester in said housing and having opposed electrodes, one electrode being electrically connected to the contact portion of the other line terminal, the surge voltage arresters being juxtaposed longitudinally of said housing in substantially end-to-end relation and on opposite sides of the contact portion of the ground terminal and with said ground terminal contact portion electrically connected to the other electrode of each surge voltage arrester so as to provide surge voltage protection from each line terminal to said ground terminal, each of said line terminal contact portions being at an end of its associated terminal and extending transversely of said cavity, and a test contact in electrically conductive connection with said second line terminal and extending therefrom to a region at said one housing end, said housing being perforate at said one end for access to said first line terminal and said test contact by a test probe.

5. A line protector according to claim 4 in which said housing has end walls, and said test contact is seated in notches in said end walls.

6. A line protector according to claim 4 or claim 5 in which said pin portions are in the same plane, there are fingers integral with said housing and projecting from said other end, and said fingers are between and coplanar with said pin portions.

* * * * *